March 17, 1942.  S. M. BURKA ET AL  2,276,285
PILOT'S DRIFT METER AND BOMB SIGHT
Filed April 5, 1939
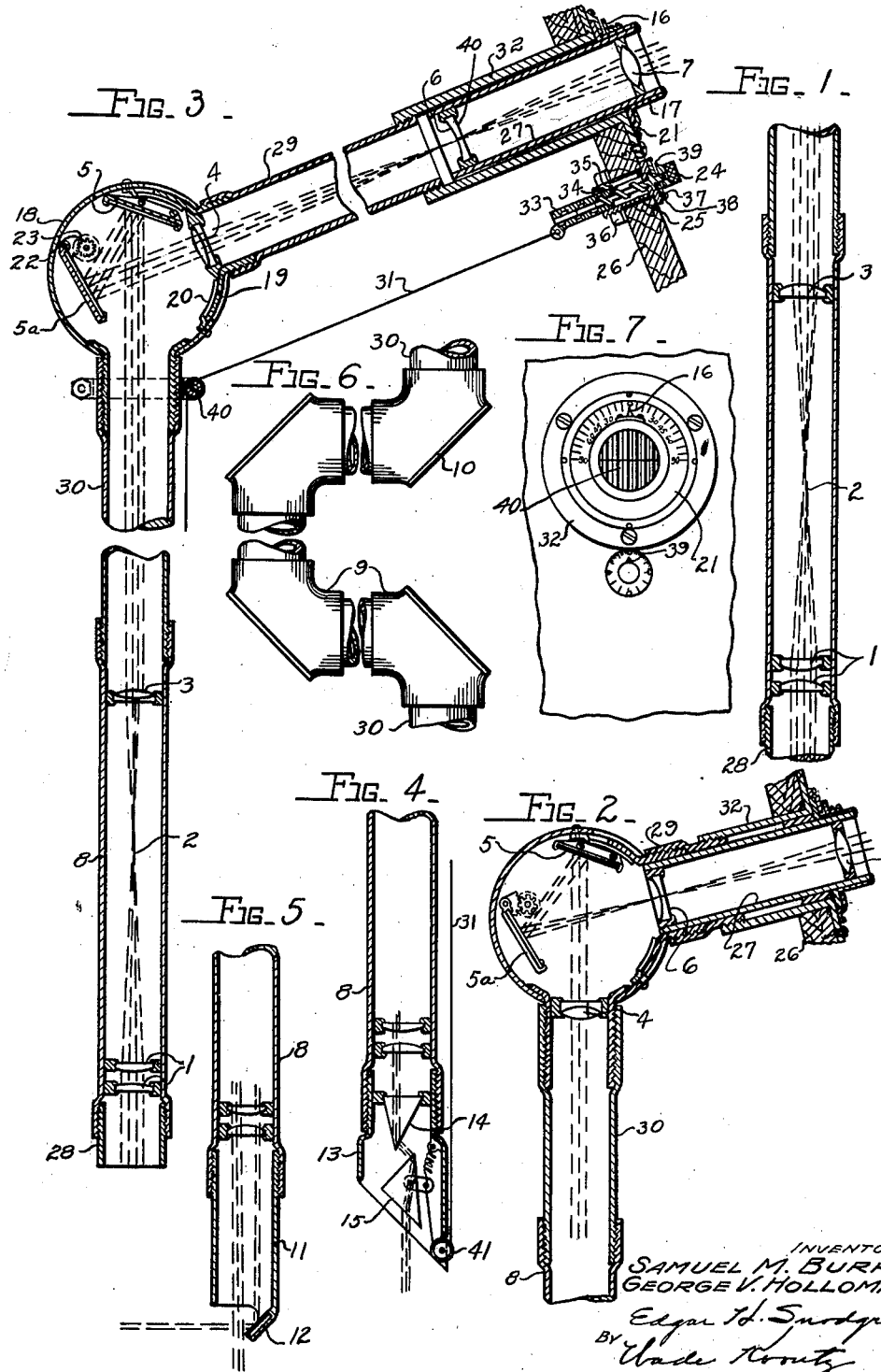

Patented Mar. 17, 1942

2,276,285

UNITED STATES PATENT OFFICE 2,276,285

PILOTS' DRIFT METER AND BOMB SIGHT

Samuel M. Burka, Dayton, and George V. Holloman, Fairfield, Ohio

Application April 5, 1939, Serial No. 266,093

7 Claims. (Cl. 88—1)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a drift indicating and measuring instrument flexibly designed so that it may be easily mounted on different airplanes. The optical system is designed so that an object may be observed by the pilot with his head in normal flying position. A forward vision element may be provided on the objective end of the device and observable in the eyepiece end to assist the pilot in maintaining a straight flight. The device is constructed so that it may be mounted in an airplane regardless of normal obstructions. An auxiliary head is provided for the objective end of the device so that it may be used as a low altitude bombing sight.

In the drawing, Figure 1 is a cross-sectional view of the objective end showing the lens system;

Figure 2 is a cross-sectional view showing the eyepiece optical system in the embodiment where the bend is made directly back of the instrument board;

Figure 3 is a cross-sectional view, similar to Figure 2, but including the objective end shown in Figure 1 and showing the eyepiece end modified to extend through a fire wall before making the bend;

Figure 4 is a cross-sectional view of the entrance end of the instrument, showing an auxiliary head for use as a bombing sight;

Figure 5 is a cross-sectional view similar to Figure 4, showing an auxiliary head having forward vision means;

Figure 6 shows in elevation an arrangement of mirrors used in the optical system for circumventing obstructions; and Figure 7 is an elevational view of the instrument panel and eyepiece.

Referring to the construction shown in Figure 3, an object on the ground is imaged by the lens system 1 at 2, and the rays rendered parallel again by the lens 3. Lenses 1 and 3 are mounted in tube 8 to form a comparatively high-powered telescope, referred to herein as the objective end of the drift meter. Since the objects observed by the drift meter are a relatively great distance therefrom, the pencils or bundles of rays emanating from each point on the observed objects are received in parallel relationship, while separate bundles are received in the objective end in a divergent relationship depending upon the size of the field. The bundles are transmitted to the objective end with a slight angle of divergence between the separate bundles. These bundles are received in the eyepiece end which is inversely positioned optically with respect to the objective end and imaged with a field of a predetermined size. Lenses 4, 6 and 7 form a comparatively high powered telescope referred to as the eyepiece end of the drift meter. The parallel rays from lens 3 are changed in direction and retained as an erect image by the mirrors 5 and 5a, suitably placed to transmit the image to lens 4, which focuses the rays on the plane face of diverging lens 6. The diverging or negative lens 6 is placed in the focal plane of lens 4 and consequently does not change the power of the eyepiece telescope system but serves to place the exit pupil of the system, and consequently the observer's eye position, at a desired distance (approximately 20 inches) beyond the eye lens 7. Parallel reference lines at right angles to a single reference line are etched or engraved on the plane face of negative lens 6 to form a reticle 40. As shown in Figure 7 this reticle is observed in eye lens 7. In using the device the pilot looks into the eye lens 7 with his head in normal flying position, sees the image on the ground superimposed on the reticle lines on lens 6, and rotates the tube 27, and consequently the reticle lens 6, until the relative movement of the ground object is parallel to the reticle lines. The angle of drift is measured by means of a pointer 16 cooperating with a suitable scale on the instrument panel.

In the construction shown in Figure 3, the tubing 29 and 30 may be of a selected length to accommodate the drift meter to different airplanes. Since the rays of light in tube 30 are in parallel pencils, the optical characteristics of the system will not be affected by varying its length. If tube 30 becomes too long, a unit power erecting telescope may be inserted therein to maintain the slightly diverging rays of the separate pencils or bundles within the confines of the tube. Lens 4 is properly located in tube 29 to retain the optical characteristics of the eyepiece end. The drift meter is constructed to be angularly adjustable by means of members 19 and 20. As shown in Figures 2 and 3, housing 18 is cut away to permit movement of tube 29 relative to tube 30 in a vertical plane. The arcuate portions of 19 are of sufficient width to be adjustably received by members 20 fastened to the inside of housing 18. Four such members 20 are provided to properly engage the arcuate portions of member 19. Mirror 5a is pivotally mounted on housing 18 by pin 22 and adjustable by gears 23 connected to and operated by a suitable knob (not shown) on the outside of housing 18. Tube 29 is suitably connected to instrument panel 26 by tube 32 in which is rotatably mounted a further tube 27 carrying diverging lens 6 and eyepiece lens 7. Tube 27 is held against longitudinal movement by collar 21 engaging a flange on member 17 which in turn is spot welded to member 27. Member 27 also carries pointer 16 readable on a suitable scale on 21.

In the installation shown in Figure 2 the bend is made directly back of the instrument board and between lenses 4 and 6, mirrors 5 and 5a being placed therebetween. The optical distance between lenses 4 and 6 and lenses 6 and 7 is the same in Figure 2 as in Figure 3.

If it is desired to simultaneously view ground objects and the horizon, head 28 may be replaced by auxiliary head 11 (Fig. 5) having a horizon mirror 12 placed thereon at an angle of approximately 45° to the longitudinal axis of the objective end so that a narrow pencil of rays from the horizon transmit through the system an image of the horizon to eyepiece 7. A lateral motion of the horizon image indicates to the pilot that the airplane is turning, whereas the image of the horizon will remain stationary if the airplane is being flown in a straight line. Thus, by observing through mirror 12 an object on the horizon or a distant cloud bank in the sky, the pilot can maintain a straight line flight while making the drift measurement.

As shown in Figure 6 a system of mirrors 10 may be used in connection with appropriate elbows 9 to circumvent obstructions in the airplane to aid in installation of the drift meter.

If it is desired to use the device as a low altitude bomb sight, auxiliary head 13, containing fixed prism 14 and rotatable prism 15, is mounted on the device to replace head 28. Prism 15 is tilted by any suitable means, such as a wire 31, which extends up to instrument panel 26, where it is suitably mounted to indicate the tilt of prism 15, so that, for instance, if the prism is rotated 30° forward, any object 60° ahead of the airplane will be imaged on the center of the reticle on lens 6. Bombs may then be released when the target appears on the center line of the reticle. The two prisms, 14 and 15, are used to preserve the erectness of the image. Prism 15 is tilted by turning knob 24. This knob has a worm screw thereon cooperating with a collar 33 to which is connected a wire 31 guided over suitable rollers 40 and 41. A flange 38 on member 24 is held against lateral movement by being held in a recess in bushing 25 by collar 37. A nut 36 holds bushing 25 in place. Rotation of collar 33 is prevented by projection 34 thereon, cooperating with slot 35 in bushing 25. Pointer 39, cooperating with a suitable scale, denotes the angle of tilt of prism 15.

The drift meter may be installed in different airplanes by adding lengths of tubing where the light rays are in parallel pencils or bundles and the separate bundles are only slightly divergent. It is obvious that slip joint connections may be used instead of cutting and threading the tubes. For instance, one tube may slide over the other and be held in locked position by a friction clamp.

It is obvious that various changes may be made by those skilled in the art without departing from the spirit of this invention and it is intended that the scope of the invention be limited only by the appended claims.

We claim:

1. A pilot's drift meter comprising an eyepiece end adapted to be attached to the instrument panel of an airplane with the longitudinal axis of the eyepiece end in substantial alignment with the head of the pilot when in normal flying position, an objective end adapted to be positioned so that exterior objects may be observed thereby, an optical system for transmitting an image of an observed object from said objective end to said eyepiece end, including optical means in said objective and eyepiece ends, a portion of said eyepiece end being rotatable about its longitudinal axis, a reticle carried by said rotatable portion of said eyepiece end, means for indicating the position of rotation of said portion of said eyepiece end to thereby indicate drift, and a negative lens carried by said rotatable portion and located at the equivalent focal point of the optical means in the eyepiece end for increasing the distance of images to a predetermined distance from the eyepiece end while maintaining the equivalent focal length of the optical means of the eyepiece.

2. A device as recited in claim 1 and further including a horizon mirror carried by and projecting from said objective end at an angle of 45° with respect to the longitudinal axis thereof and occupying a sector only of said objective end to thereby transmit to the said optical system an image of a distant object and enable straight line flight while measuring drift.

3. A pilot's drift meter comprising objective-end optical means, eyepiece-end optical means and means extensibly connecting said two optical means, said objective-end optical means including a high power telescope located to view objects which are located exteriorly of the airplane and at such a distance therefrom that the rays of each bundle emanating from each point on the observed objects are substantially parallel, separate bundles having a relatively great angle of divergence corresponding to the separation in the field of view of the points from which they emanate, said objective-end optical means focusing said rays and directing them as bundles of parallel rays having a slight angle of divergence between separate bundles so that the said connecting means may be extensible and the field retained within the confines of the drift meter, said eyepiece-end optical means including a high powered telescope inversely positioned with respect to said high powered telescope of said objective-end for receiving said slightly divergent bundles of parallel rays and focusing them with relatively great angles of divergence in an observable position with a field of a predetermined size.

4. A device as recited in claim 3 in which said means extensibly connecting said two optical means further includes means angularly adjustably connecting said two optical means and means for transmitting said bundles of rays from one to the other of said two optical means including a pair of mirrors, at least one of which is adjustable.

5. A drift meter including an objective end having optical means for receiving, magnifying to a high degree of magnification and transmitting in slightly divergent bundles of parallel rays images of objects located at such a distance from the objective end that the rays of each bundle from a given point are substantially parallel, the separate bundles being slightly divergent, an eyepiece end arranged with its longitudinal axis at an angle with respect to the longitudinal axis of the objective end, means for transmitting the bundles of rays from the objective end to the eyepiece end, said eyepiece end comprising optical means for focusing the slightly divergent bundles of rays at a predetermined distance from the eyepiece end with a field of a predetermined size in which objects are readily discernible including a negative lens located at approximately the equivalent focal point of the last named optical means.

6. A device as recited in claim 5 and further including a horizon mirror carried by and projecting from the said objective end at a preselected angle with respect to the longitudinal axis thereof and occupying a sector only of the image receiving portion of said objective end to thereby transmit to the said optical system an image on the distant horizon while at the same time observing objects on the ground.

7. A device as recited in claim 5 and further including means extensibly and angularly adjustably connecting the eyepiece and objective ends at a point where the separate bundles of rays are slightly divergent and a pair of mirrors in said connecting means, at least one of which is adjustable.

SAMUEL M. BURKA.
GEORGE V. HOLLOMAN.